(12) United States Patent
Sienkiewicz

(10) Patent No.: US 12,518,454 B2
(45) Date of Patent: Jan. 6, 2026

(54) SYSTEM AND METHOD FOR EFFICIENT AND FAST CREATION OF ANIMATED MMS IMAGES FOR USE WITHIN SMS MARKETING

(71) Applicant: Alexander Sienkiewicz, San Francisco, CA (US)

(72) Inventor: Alexander Sienkiewicz, San Francisco, CA (US)

( * ) Notice: Subject to any disclaimer, the term of this patent is extended or adjusted under 35 U.S.C. 154(b) by 220 days.

(21) Appl. No.: 18/119,804

(22) Filed: Mar. 9, 2023

(65) Prior Publication Data

US 2023/0290028 A1 Sep. 14, 2023

Related U.S. Application Data

(60) Provisional application No. 63/318,350, filed on Mar. 9, 2022.

(51) Int. Cl.
*G06T 13/00* (2011.01)
*G06T 3/40* (2024.01)
*G06T 11/60* (2006.01)

(52) U.S. Cl.
CPC ............... *G06T 13/00* (2013.01); *G06T 3/40* (2013.01); *G06T 11/60* (2013.01); *G06T 2200/24* (2013.01); *G06T 2210/22* (2013.01)

(58) Field of Classification Search
CPC . G06T 13/00; G06T 3/40; G06T 11/60; G06T 2200/24; G06T 2210/22
See application file for complete search history.

(56) References Cited

U.S. PATENT DOCUMENTS

| 2008/0196076 | A1* | 8/2008 | Shatz | H04N 19/15 375/E7.134 |
| 2016/0062573 | A1* | 3/2016 | Dascola | G06F 3/0482 715/810 |
| 2020/0005493 | A1* | 1/2020 | Jiang | G06T 9/00 |

OTHER PUBLICATIONS

Media Gennis.*

* cited by examiner

*Primary Examiner* — Edward Martello
(74) *Attorney, Agent, or Firm* — White-Welker & Welker, LLC; Matthew T. Welker, Esq.

(57) ABSTRACT

A system and method for efficient and fast creation of animated MMS images for use within SMS marketing. An intuitive web application provides a preview of the designated MMS size (either 480×720, 480×460, 640×640, 480×480) while the user is scaling the image. Once the first image is uploaded, the user is presented with several options to facilitate the creation of an MMS image. Once a second image is uploaded, the MMS will become animated and the User is presented with several options. The User can proceed with: uploading additional images, changing MMS dimensions, changing the cropping of any of the images uploaded, compressing the animated gif, changing the order of the frames in the animation, and changing the time animation. Finally, the User is presented with the ability to download the animated MMS as a .GIF file for use in any SMS Marketing Platform.

26 Claims, 20 Drawing Sheets

FANCYMMS

Quickly and Efficiently Create & Optimize your MMS for your next SMS Send

Select MMS Dimensions

FANCYMMS

Quickly and Efficiently Create & Optimize your MMS for your next SMS Send

SYSTEM AND METHOD FOR EFFICIENT AND FAST CREATION OF ANIMATED MMS IMAGES FOR USE WITHIN SMS MARKETING

FEDERALLY SPONSORED RESEARCH

Not Applicable

SEQUENCE LISTING OR PROGRAM

Not Applicable

TECHNICAL FIELD OF THE INVENTION

The present invention relates generally to short message service (SMS) that allows individuals to send short text messages with wireless devices, such as mobile phones. More specifically, the present invention relates to a system and method specifically tailored for efficient and fast creation of animated MMS images for use within SMS Marketing.

BACKGROUND OF THE INVENTION

SMS Marketing is a rapidly growing channel for digital retention marketers. According to Juniper Research, global mobile business messaging traffic hit 2.7 trillion in 2020, up 10% from 2019. Brands are using SMS in various customer communication applications, including marketing messages, customer support, transactional messages, and more.

Consumers are spending a significant amount of time on their mobile devices with the average adult on their device for several hours every day. Since much of this time is spent texting, many businesses have correctly surmised that SMS is one of the most effective channels for businesses to reach new and existing customers.

MMS marketing is a method of mobile advertising that uses MMS, or Multimedia Messaging Service, to send enhanced text messages, which are commonly picture based or animated. Recently, MMS marketing has become an extremely popular way to send SMS Marketing Messages and is now commonly used amongst Business-to-Consumer (B2C) Brands and Retailers.

The reason MMS has gained popularity is due to the fact that images and animated images are powerful visual aids to an SMS Message. MMS messages differ from SMS text based messaging, as they allow for more storytelling through visually appealing messages. A consumer survey done by an SMS Marketing Company in 2021 found that 51% of consumers are more likely to complete a purchase if a SMS message includes an MIMS.

While MMS messaging, and more specifically animated MMS messaging has grown in popularity, it is extremely time consuming and cumbersome for a business user to create an animated MMS image. The reason for this is two fold.

First, Current Graphic Design Software are not suited for the creation of animated GIFS for MMS Sending, as they have a steep learning curve, which makes the business user reliant on someone proficient in the software to create the MMS image.

Secondly, SMS Marketing Platforms require an MMS image to be below a specific file size, which is usually under 500 kb. Animated MMS images are usually large in file size when created due to the fact that it consists of multiple images stitched together. Current available Graphic Design Software do not provide the necessary compression tools to ensure an outputted animated GIF is below the 500 kb threshold. Due to this limitation, it is challenging to create an animated MMS GIF that will be accepted by an SMS Marketing Platform.

The workflow process for creating and sending an SMS text message is generally fast, since the business user is only composing a text based message. The workflow process becomes inefficient when MMS messages need to be included due to the limitations highlighted above.

An objective of the present invention is to provide an efficient method and workflow process which allows the business user to quickly create a high resolution single MMS or animated MMS GIF that is compatible with all SMS Marketing Platforms.

To do this, an intuitive web application is needed that specifically focuses on the requirements of creating an MMS image. This includes image uploading, resizing, cropping, selecting a recommended MMS image dimensions (480×720, 480×460, 640×640, 480×480), instant previewing, animated image reordering, animated speed controls, and image compression.

Definitions

Unless stated to the contrary, for the purposes of the present disclosure, the following terms shall have the following definitions:

Administrators, commonly known as admins or sysops (system operators), are software or system users who have been granted the technical ability to perform certain special actions.

"Application software" is a set of one or more programs designed to carry out operations for a specific application. Application software cannot run on itself but is dependent on system software to execute. Examples of application software include MS Word, MS Excel, a console game, a library management system, a spreadsheet system etc. The term is used to distinguish such software from another type of computer program referred to as system software, which manages and integrates a computer's capabilities but does not directly perform tasks that benefit the user. The system software serves the application, which in turn serves the user.

"API" In computer programming, an application programming interface (API) is a set of routines, protocols, and tools for building software applications. An API expresses a software component in terms of its operations, inputs, outputs, and underlying types. An API defines functionalities that are independent of their respective implementations, which allows definitions and implementations to vary without compromising each other.

A client is a piece of computer hardware or software that accesses a service made available by a server. The server is often (but not always) on another computer system, in which case the client accesses the service by way of a network. The term applies to programs or devices that are part of a client-server model.

"Electronic Mobile Device" is defined as any computer, phone, smartphone, tablet, or computing device that is comprised of a battery, display, circuit board, and processor that is capable of processing or executing software. Examples of electronic mobile devices are smartphones, laptop computers, and table PCs.

A gateway is a link between two computer programs or systems such as Internet Forums. A gateway acts as a portal between two programs allowing them to share information by communicating between protocols on a computer or between dissimilar computers.

"GUI". In computing, a graphical user interface (GUI) sometimes pronounced "gooey" (or "gee-you-eye")) is a type of interface that allows users to interact with electronic devices through graphical icons and visual indicators such as secondary notation, as opposed to text-based interfaces, typed command labels or text navigation. GUIs were introduced in reaction to the perceived steep learning curve of command-line interfaces (CLIs), which require commands to be typed on the keyboard.

The Hypertext Transfer Protocol (HTTP) is an application protocol for distributed, collaborative, hypermedia information systems. HTTP is the foundation of data communication for the World Wide Web. Hypertext is structured text that uses logical links (hyperlinks) between nodes containing text. HTTP is the protocol to exchange or transfer hypertext.

The Internet Protocol (IP) is the principal communications protocol in the Internet protocol suite for relaying datagrams across network boundaries. Its routing function enables internetworking, and essentially establishes the Internet.

An Internet Protocol address (IP address) is a numerical label assigned to each device (e.g., computer, printer) participating in a computer network that uses the Internet Protocol for communication. An IP address serves two principal functions: host or network interface identification and location addressing.

An Internet service provider (ISP) is an organization that provides services for accessing, using, or participating in the Internet.

iOS (originally iPhone OS) is a mobile operating system created and developed by Apple Inc. and distributed exclusively for Apple hardware. It is the operating system that presently powers many of the company's mobile devices, including the iPhone, iPad, and iPod touch.

Short for Multimedia Message Service, MMS is a messaging system capable of distributing text messages with graphics, sounds, and videos over WAP (Wireless Application Protocol). It is a texting standard that replaced SMS, which had a short limit of about 160 characters, and did not allow multimedia attachments.

A "mobile app" is a computer program designed to run on smartphones, tablet computers and other mobile devices, which the Applicant/Inventor refers to generically as "a computing device", which is not intended to be all inclusive of all computers and mobile devices that are capable of executing software applications.

A "mobile device" is a generic term used to refer to a variety of devices that allow people to access data and information from wherever they are. This includes cell phones and other portable devices such as, but not limited to, PDAs, Pads, smartphones, and laptop computers.

A "module" in software is a part of a program. Programs are composed of one or more independently developed modules that are not combined until the program is linked. A single module can contain one or several routines or steps.

A "module" in hardware, is a self-contained component. An operating system (OS) is software that manages computer hardware and software resources and provides common services for computer programs. The operating system is an essential component of the system software in a computer system. Application programs usually require an operating system to function.

A server is a running instance of an application (software) capable of accepting requests from the client and giving responses accordingly. Servers can run on any computer including dedicated computers, which individually are also often referred to as "the server".

Short for short message service, SMS is a widely-accepted wireless service that allows individuals to send short text messages with wireless devices, such as mobile phones and pagers. See the text message definition for additional information and links related to this term.

A "software application" is a program or group of programs designed for end users. Application software can be divided into two general classes: systems software and applications software. Systems software consists of low-level programs that interact with the computer at a very basic level. This includes operating systems, compilers, and utilities for managing computer resources. In contrast, applications software (also called end-user programs) includes database programs, word processors, and spreadsheets. Figuratively speaking, applications software sits on top of systems software because it is unable to run without the operating system and system utilities.

A "software module" is a file that contains instructions. "Module" implies a single executable file that is only a part of the application, such as a DLL. When referring to an entire program, the terms "application" and "software program" are typically used. A software module is defined as a series of process steps stored in an electronic memory of an electronic device and executed by the processor of an electronic device such as a computer, pad, smart phone, or other equivalent device known in the prior art.

A "software application module" is a program or group of programs designed for end users that contains one or more files that contains instructions to be executed by a computer or other equivalent device.

A "smartphone" (or smart phone) is a mobile phone with more advanced computing capability and connectivity than basic feature phones. Smartphones typically include the features of a phone with those of another popular consumer device, such as a personal digital assistant, a media player, a digital camera, and/or a GPS navigation unit. Later smartphones include all of those plus the features of a touchscreen computer, including web browsing, wideband network radio (e.g. LTE), Wi-Fi, 3rd-party apps, motion sensor and mobile payment.

A "smart dot" or "SD" is a vehicle transmitter that has the capability through a transmitter, or a variety of transmitters to broadcast the vehicle's speed, velocity, instantaneous velocity, angular velocity, acceleration, deceleration or other data that can be used to determine if a vehicle is in motion.

URL is an abbreviation of Uniform Resource Locator (URL), it is the global address of documents and other resources on the World Wide Web (also referred to as the "Internet").

A "User" is any person registered to use the computer system executing the method of the present invention.

In computing, a "user agent" or "useragent" is software (a software agent) that is acting on behalf of a user. For example, an email reader is a mail user agent, and in the Session Initiation Protocol (SIP), the term user agent refers to both end points of a communications session. In many cases, a user agent acts as a client in a network protocol used in communications within a client-server distributed computing system. In particular, the Hypertext Transfer Protocol (HTTP) identifies the client software originating the request, using a "UserAgent" header, even when the client is not operated by a user. The SIP protocol (based on HTTP) followed this usage.

A "web application" or "web app" is any application software that runs in a web browser and is created in a browser-supported programming language (such as the combination of JavaScript, HTML, and CSS) and relies on a web browser to render the application.

A "website", also written as Web site, web site, or simply site, is a collection of related web pages containing images, videos or other digital assets. A website is hosted on at least one web server, accessible via a network such as the Internet or a private local area network through an Internet address known as a Uniform Resource Locator (URL). All publicly accessible websites collectively constitute the World Wide Web.

A "web page", also written as webpage is a document, typically written in plain text interspersed with formatting instructions of Hypertext Markup Language (HTML, XHTML). A web page may incorporate elements from other websites with suitable markup anchors.

Web pages are accessed and transported with the Hypertext Transfer Protocol (HTTP), which may optionally employ encryption (HTTP Secure, HTTPS) to provide security and privacy for the user of the web page content. The user's application, often a web browser displayed on a computer, renders the page content according to its HTML markup instructions onto a display terminal. The pages of a website can usually be accessed from a simple Uniform Resource Locator (URL) called the homepage. The URLs of the pages organize them into a hierarchy, although hyperlinking between them conveys the reader's perceived site structure and guides the reader's navigation of the site.

SUMMARY OF THE INVENTION

The purpose of the present invention is to provide a system and method for efficient and fast creation of animated MMS images for use within SMS marketing.

The present invention as described herein teaches an efficient method and workflow process which allows the business user to quickly create a high resolution single frame, non-animated MMS or animated MMS GIF that is compatible with all SMS Marketing Platforms.

To do this, an intuitive web application is needed that specifically focuses on the requirements of creating an MMS image. This includes image uploading, resizing, cropping, selecting a recommended MMS image dimensions (480×720, 480×460, 640×640, 480×480), instant previewing, animated image reordering, animated speed controls, and image compression. Note that while the current embodiment of the present invention provides recommended MMS image dimensions of 480×720, 480×460, 640×640, and 480×480, this can be modified or changed in alternative embodiments.

Since business users often have large photos in their DAM (digital asset manager), the web application taught by the present invention supports large and high resolution images where the MMS dimensions can be resized and cropped down to one of the four selectable MMS dimensions. Users can simply drag and drop a file or photo, which is a longstanding means for selecting images and files in computer systems.

The web application provides a preview of the designated MMS size (either 480×720, 480×460, 640×640, 480×480) while the user is scaling the image. This allows the user to quickly determine the needed cropping for the photo for the selected MMS dimensions.

Once the first image is uploaded, the user is presented with several options to facilitate the creation of an MMS image. First a User is presented with a preview of the MMS rendering within a phone. Next, a User can proceed with uploading additional images. The User can resize or delete the current image uploaded. The User can change MMS dimensions to any of the other commonly used sizes. The User is presented with the current file size uncompressed. Finally, the User is presented with the ability to download the single image MMS for use in any SMS Marketing Platform.

Once a second image is uploaded, the MMS will become animated and the User is presented with several options. The User can proceed with uploading additional images. The User can change MMS dimensions to any of the other commonly used sizes. The User is presented with the current file size uncompressed with the ability to compress the animated gif. The User can change the cropping of any of the images uploaded. The User is presented The User is presented with the ability to change the order of the frames in the animation. The User is presented with the ability to change the time animation (by default, the animation is set to 1 second per frame). Finally, the User is presented with the ability to download the animated MMS as a .GIF file for use in any SMS Marketing Platform.

Since most SMS Marketing Platforms have a threshold in file size acceptance (often 500 kb), compression is required on the animated MMS to ensure the Animated GIF is below the required threshold of the business user's SMS Marketing Platform The User will be alerted when their Animated GIF is above the file size threshold of 500 kb with visual cues and messaging. The application utilizes various GIF compression libraries to allow the user to add compression to the animated GIF if the User chooses to.

Upon Selecting "Compress", a User is presented with a screen to allow compression to be added to the Animated GIF. Once Compress is selected, the User can do the following: the User is able to modify the compression and instantly see the estimated file size prior to applying the compression; the User is able to preview the compression impact to the animated GIF at any selected compression level; and the User can either cancel or apply the compression to the animated GIF by selecting "Optimize".

Once Compression is Applied, the User can do the following: the User can revert compression and continue to modify their animated MMS to their liking; the User can download the MMS; and the User can apply any of the other actions highlighted previously.

BRIEF DESCRIPTION OF THE DRAWINGS

The accompanying drawings, which are incorporated herein a form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention is practiced. These embodiments are described in sufficient detail to enable those skilled in the art to practice the invention, but other embodiments is utilized and logical, mechanical, electrical, and other changes is made without departing from the scope of the present invention. The following detailed description is, therefore, not to be taken in a limiting sense, and the scope of the present invention is defined only by the appended claims.

The present invention teaches a system and method specifically tailored for efficient and fast creation of animated MMS images for use within SMS Marketing.

The present invention as described herein teaches an efficient method and workflow process which allows the business user to quickly create a high resolution single MMS or animated MMS GIF that is compatible with all SMS Marketing Platforms.

To do this, an intuitive web application is needed that specifically focuses on the requirements of creating an MMS image. This includes image uploading, resizing, cropping, selecting a recommended MMS image dimensions (480×720, 480×460, 640×640, 480×480), instant previewing, animated image reordering, animated speed controls, and image compression.

Figure 1:
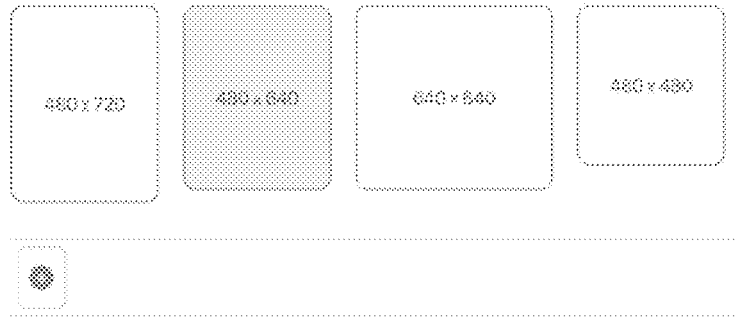
FIG. 1 is a simulated screen image for the system and method taught by the present invention for creating and optimizing MMS for SMS and illustrating the MMS size/dimensions selection process.
Figure 1:
Figure 1:
Figure 2:
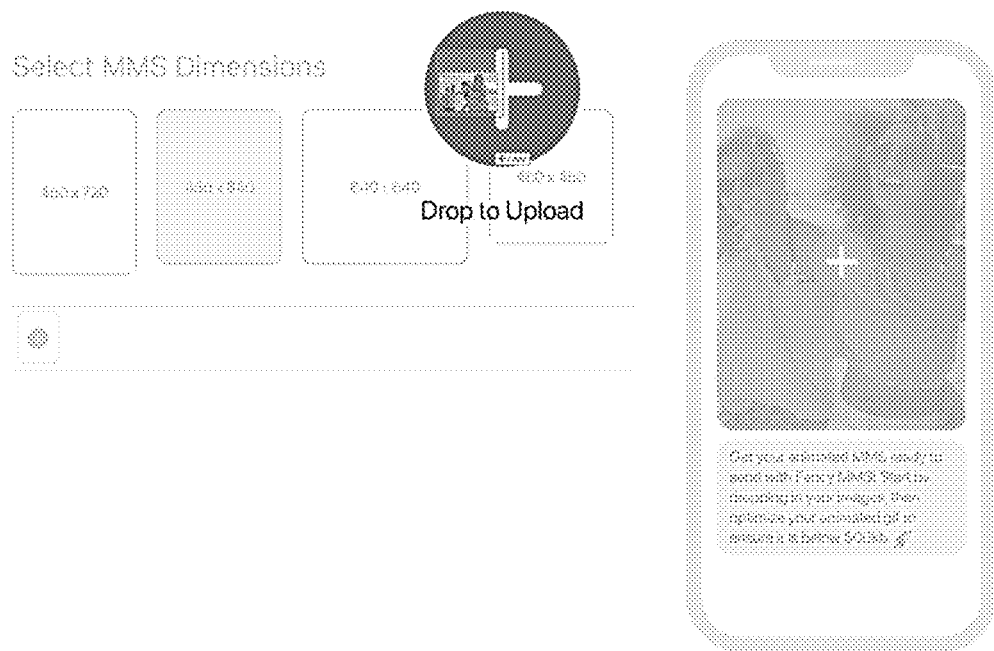
FIG. 2 is a simulated screen image for the drag and drop file uploading process taught by the present invention.

Now referring to the screenshot of FIGS. 1-2 a drag and drop view for uploading is shown. Since business users often have large photos in their DAM (digital asset manager), the web application taught by the present invention supports large and high resolution images where the MMS dimensions are the cropped down versions as shown as the four selectable MMS dimensions in FIG. 1. As shown in FIG. 2, users can simply drag and drop a file or photo, which is a longstanding means for selecting images and files in computer systems.

Figure 3:
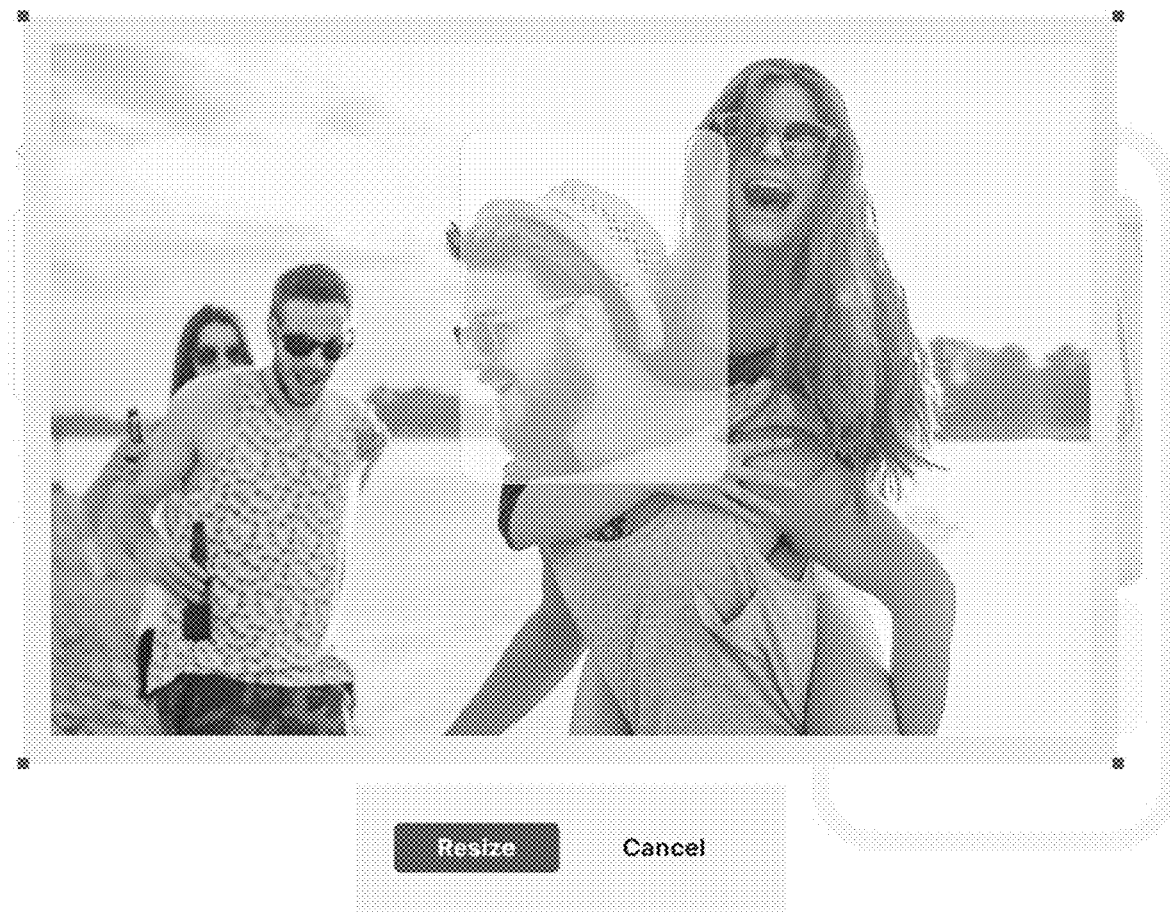
FIGS. 3-4 are simulated screen images for the resizing method taught by the present invention.
Figure 4:
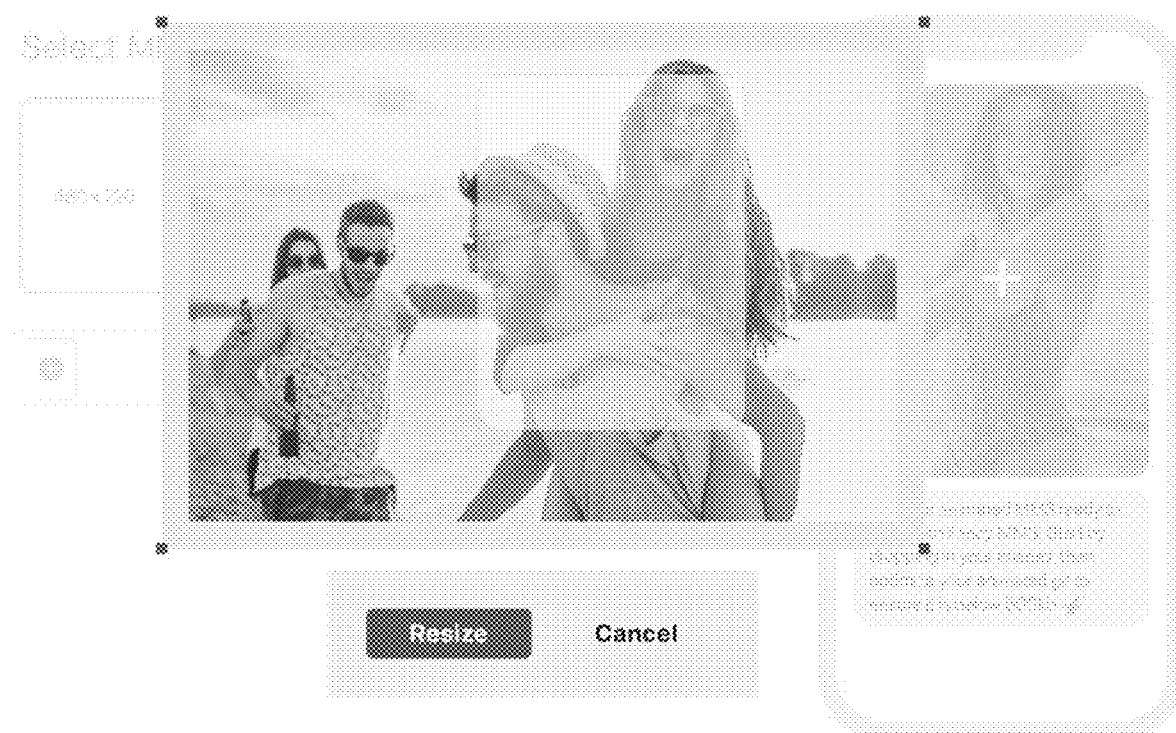
Figure 5:
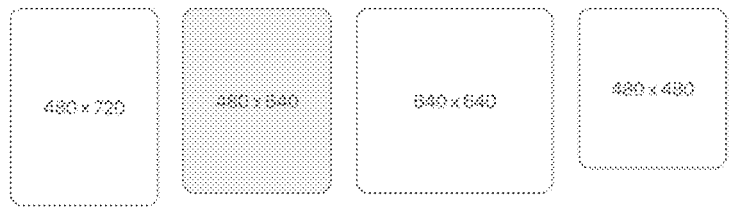
FIG. 5 is a simulated screen image illustrating the completion of a first uploaded image and providing the input screen for uploading an additional photo, again by the drag and drop method with MMS dimension selections.
Figure 5:
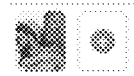
Figure 5:
Figure 5:

The process for Image, Resizing, and Cropping are illustrated in FIGS. 3-4. Since business users often have large photos in their DAM (digital asset manager), the web application supports image files of any size and resolution. The web application provides a preview of the designated MMS size (either 480×720, 480×460, 640×640, 480×480) while the user is scaling the image. This allows the user to quickly determine the needed cropping for the photo for the selected MMS dimensions. As shown in FIGS. 3-4, a User can confirm the resizing by selecting "resize" or cancel out.

Figure 6:
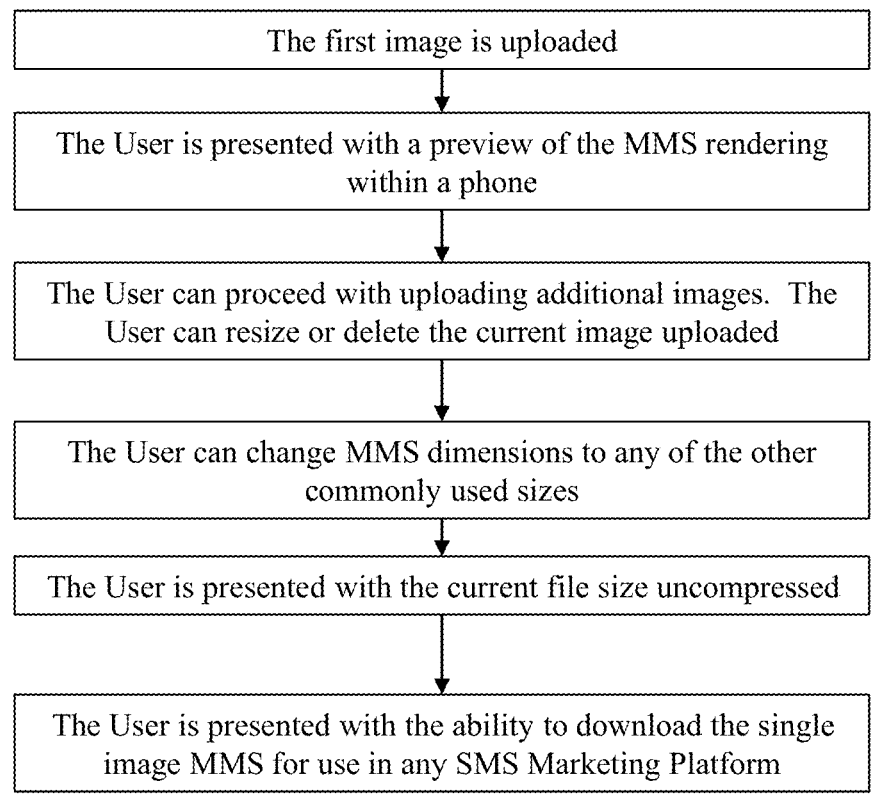
FIG. 6 is a flow chart illustrating the first image uploading process and User options as taught by the present invention.
Figure 7:
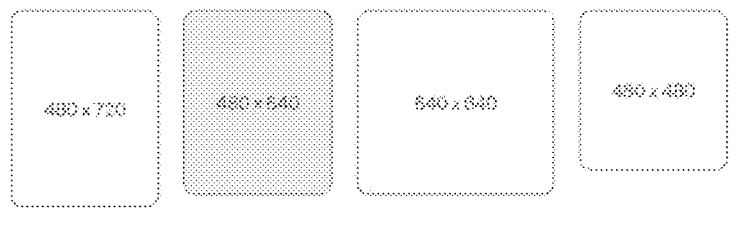
FIG. 7 is a simulated screen shot after the user has uploaded two or more images to successfully create an animated MMS and again displaying the process for adding additional photos via the drag and drop method with MMS dimension selections.
Figure 7:
Figure 7:
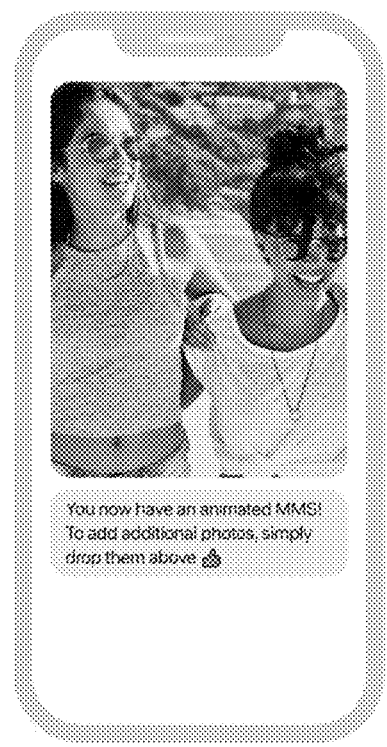
Figure 8:
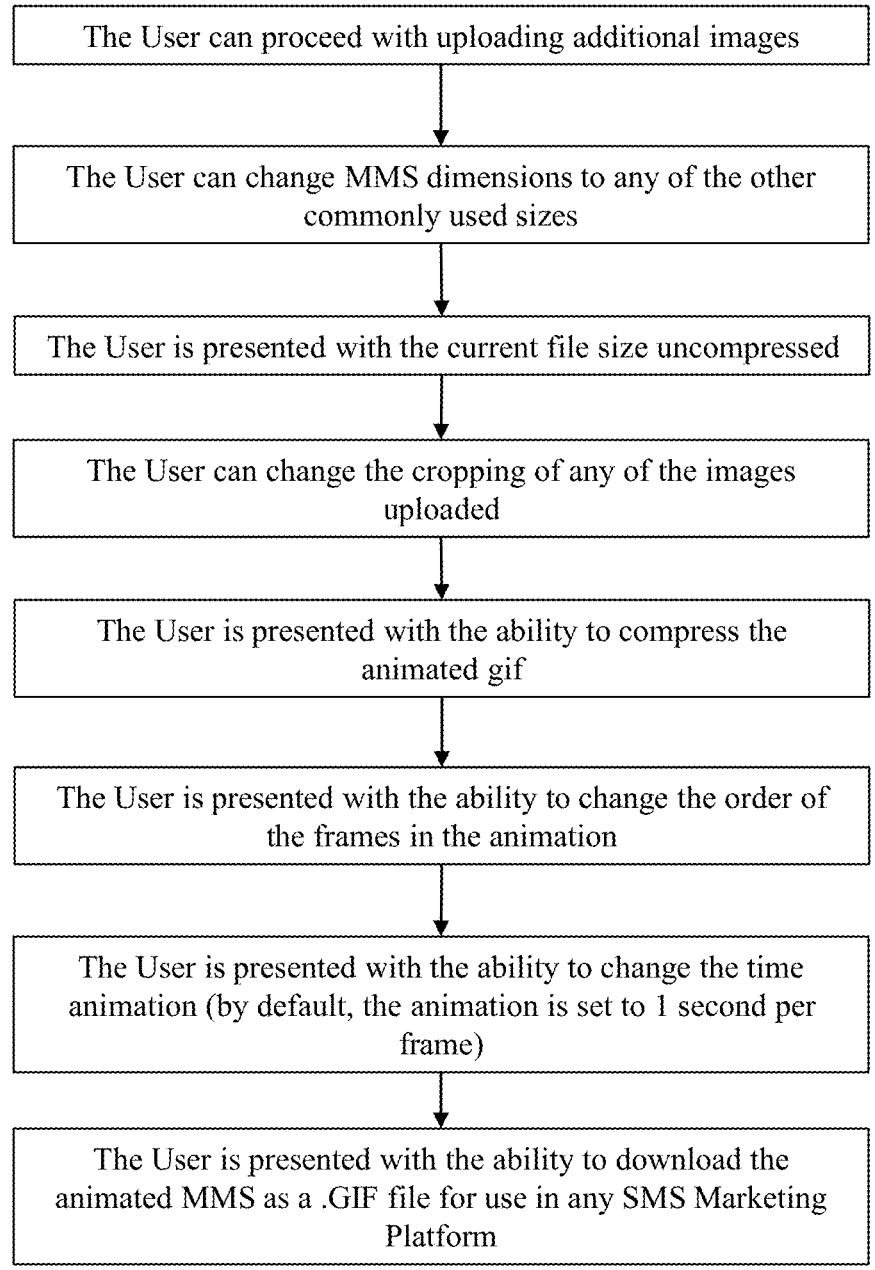
FIG. 8 is a flow chart illustrating the additional image uploading process and User options as taught by the present invention.
Figure 9:
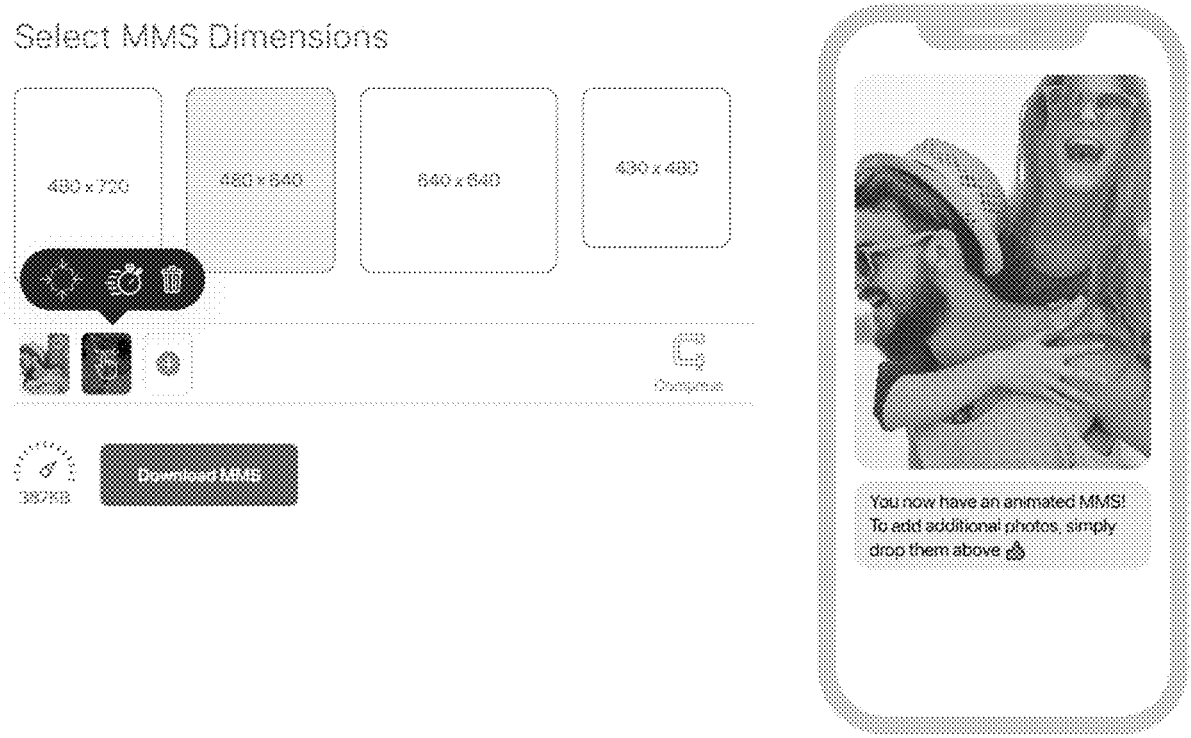
FIG. 9 is a simulated screen shot after the user has uploaded two or more images to successfully create an animated MMS and again displaying the process for adding additional photos via the drag and drop method with MMS dimension selections and further providing clickable icons for cropping/resizing options, and display timing options, or to delete the uploaded files/pictures.
Figure 10:
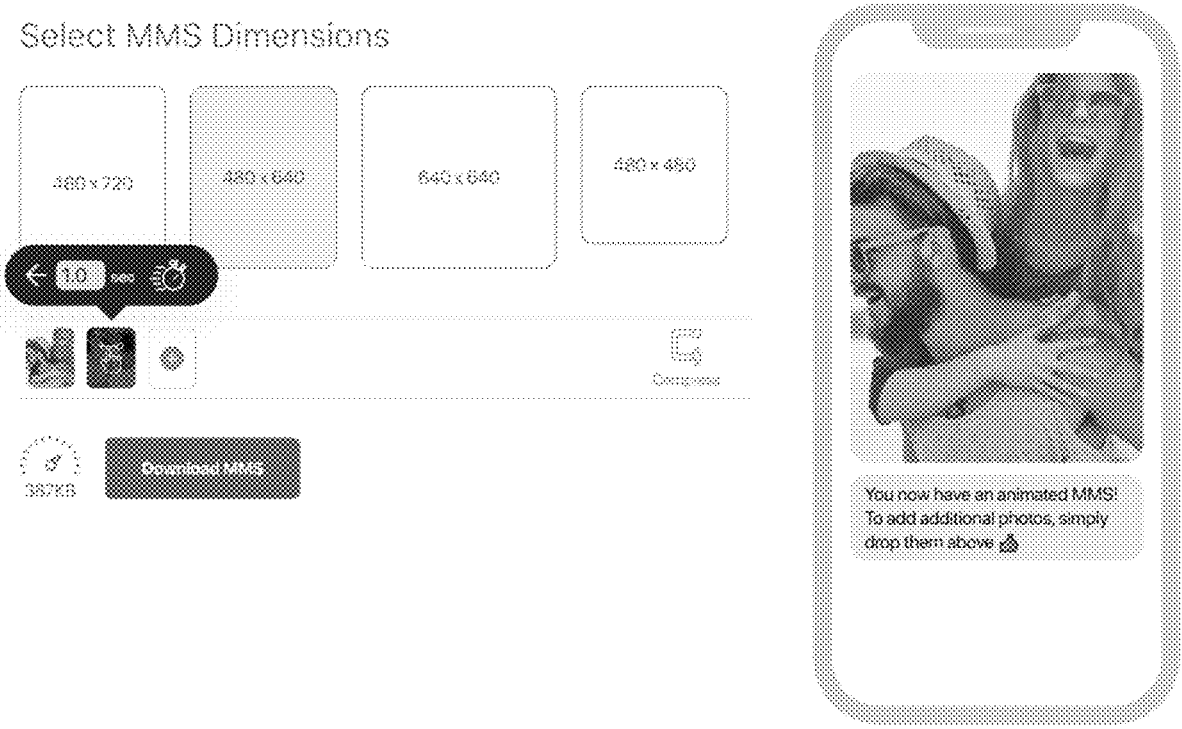
FIG. 10 is a simulated screen shot after the user how uploaded two or more images to successfully create an animated MMS and again displaying the process for adding additional photos via the drag and drop method with MMS dimension selections and further providing a clickable icon for display timing options, where the time has been set to 1 second and is illustrated.

As shown in FIG. 6, once the first image is uploaded, the user is presented with several options to facilitate the creation of an MMS image. First a User is presented with a preview of the MMS rendering within a phone. Next, a User can proceed with uploading additional images as shown in FIG. 7. The User can resize or delete the current image uploaded. The User can change MMS dimensions to any of the other commonly used sizes. The User is presented with the current file size uncompressed. Finally, the User is presented with the ability to download the single image MMS for use in any SMS Marketing Platform.

Once the second image is uploaded, the MMS will become animated and the User is presented with several options as shown in FIGS. 8-11. The User can proceed with uploading additional images. The User can change MMS dimensions to any of the other commonly used sizes. The User is presented with the current file size uncompressed. The User can change the cropping of any of the images uploaded. The User is presented with the ability to compress the animated GIF.

Figure 11:
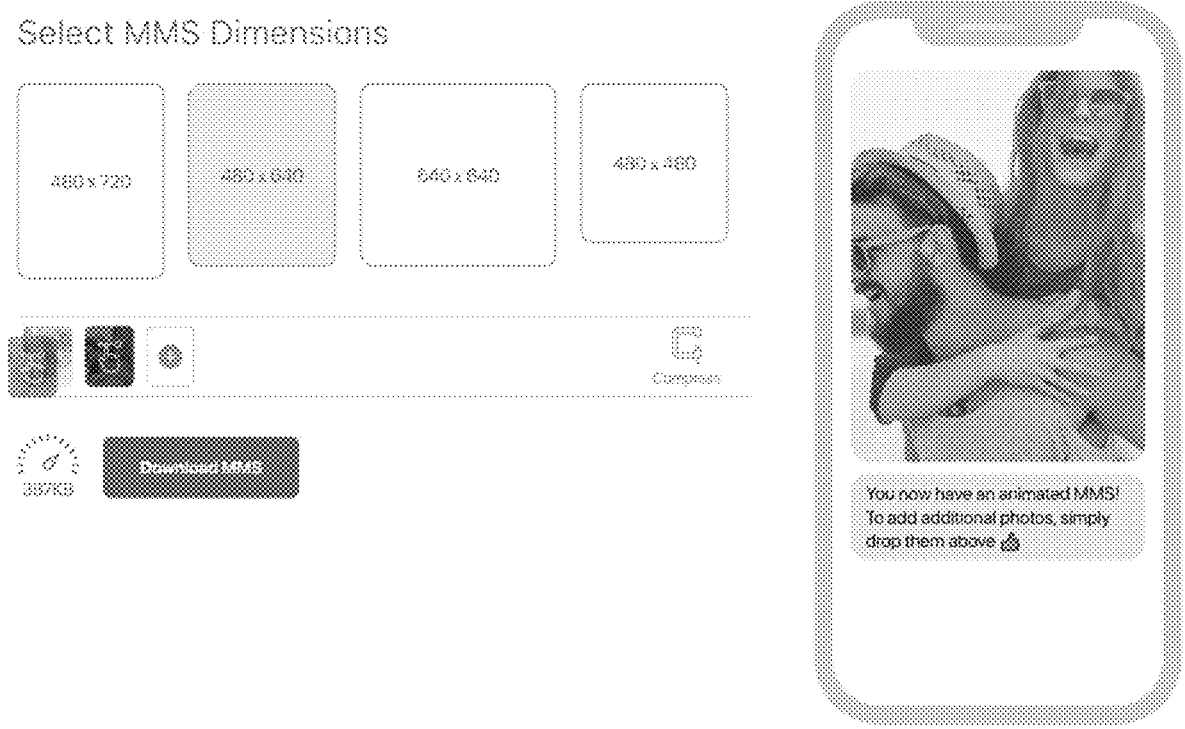
FIG. 11 is a simulated screen shot after the user has uploaded two or more images to successfully create an animated MMS and displaying the method for order rearrangement of photo frames as taught by the present invention.

FIG. 11 is a simulated screen shot after the user has uploaded two or more images to successfully create an animated MMS and displaying the method for order rearrangement of photo frames as taught by the present invention. The User is presented with the ability to change the order of the frames in the animation. The User is presented with the ability to change the time animation (by default, the animation is set to 1 second per frame).

Finally, the User is presented with the ability to download the animated MMS as a .GIF file for use in any SMS Marketing Platform.

Figure 12:
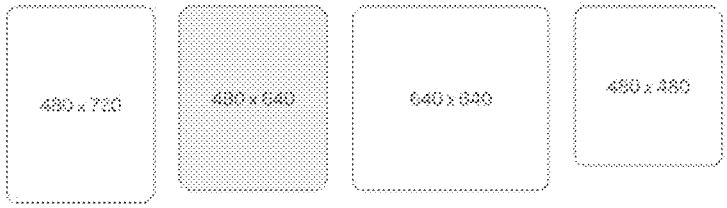
FIG. 12 is a simulated screen shot after the user has uploaded two or more images to successfully create an animated MMS and again displaying the process for adding additional photos via the drag and drop method with MMS dimension selections with an icon showing the file size of the images upload.
Figure 12:
Figure 12:
Figure 12:
Figure 12:
Figure 12:

Now referring to FIG. 12, Use Case: Additional Image(s) Uploaded and File Size exceeds 500 kb. Since most SMS Marketing Platforms do not accept MMS images above 500 kb, compression is required on the animated MMS to ensure the Animated GIF is below this size. The User will be alerted when their Animated GIF is above the recommended image size of 500 kb with visual cues as well as a message. The application utilizes various GIF compression libraries to allow the user to add compression to the animated GIF if the User chooses to.

Figure 13:
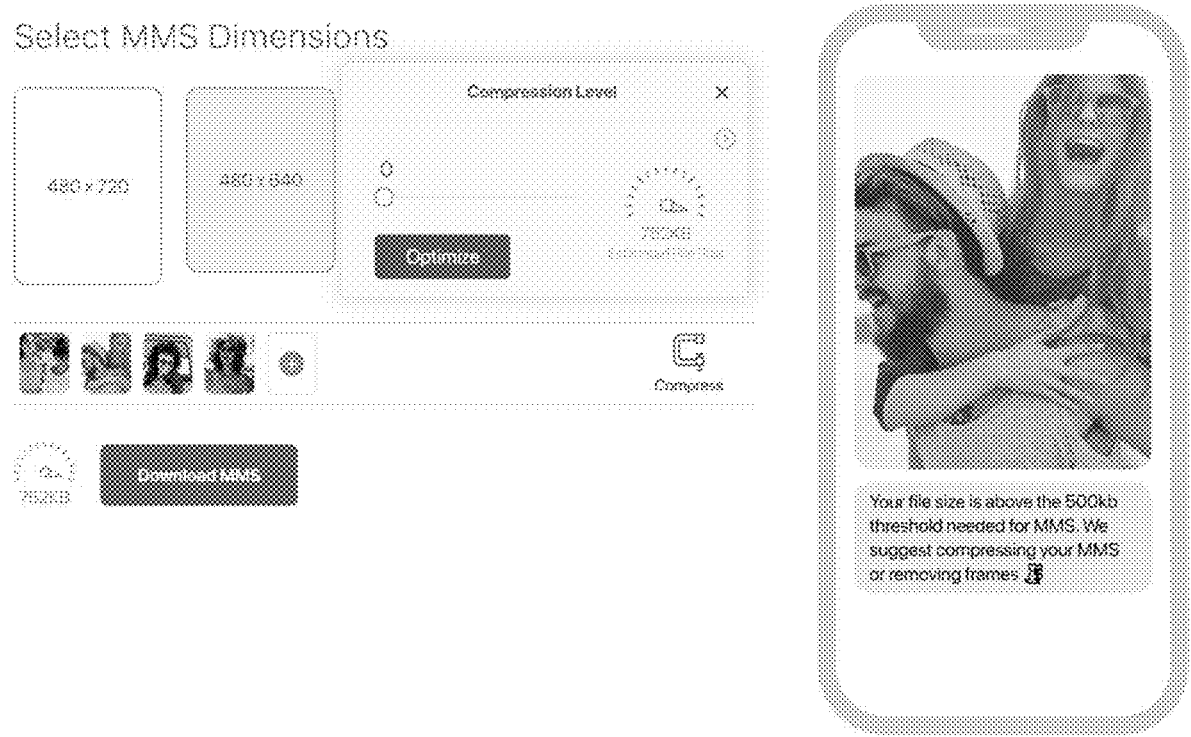
FIGS. 13-15 is a simulated screen shot after the user has uploaded two or more images to successfully create an animated MMS and again displaying the process for adding additional photos via the drag and drop method with MMS dimension selections with an icon showing the file size of the images upload and providing a clickable compression level optimization tool, where the tool shows the compression level/percentage, and the new estimated file size and the old/previous file size if the selected level of compression is performed.
Figure 14:
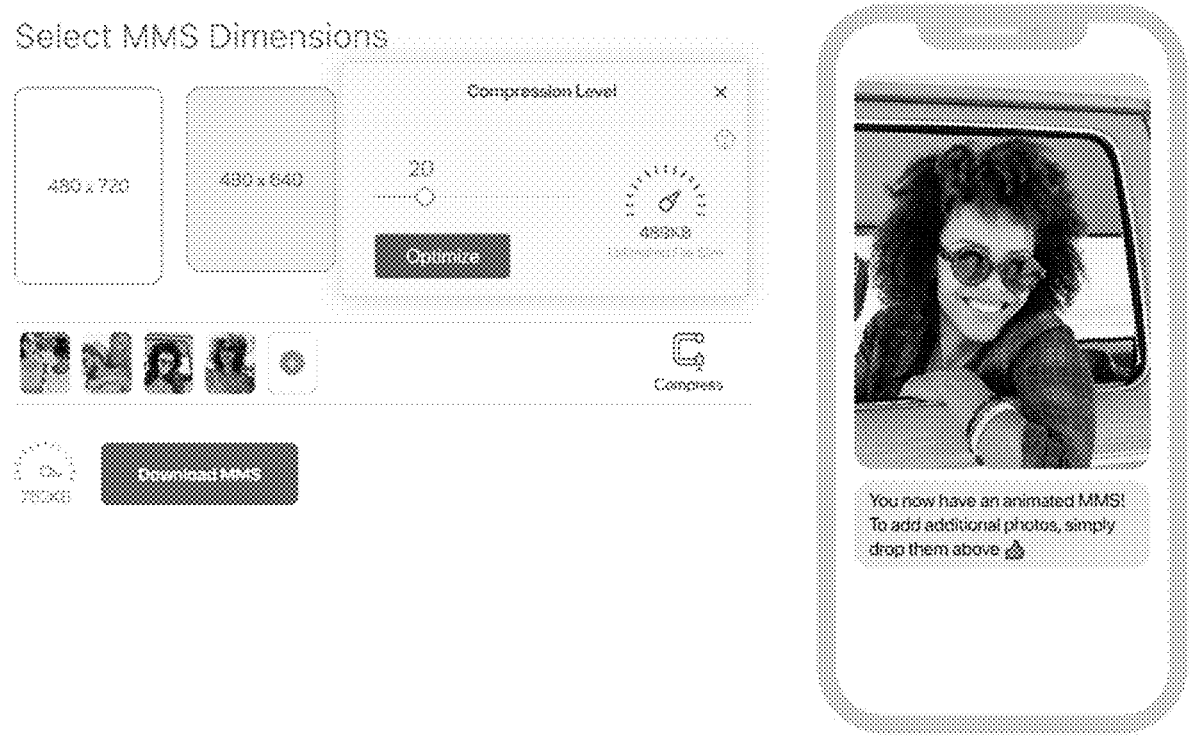
Figure 15:
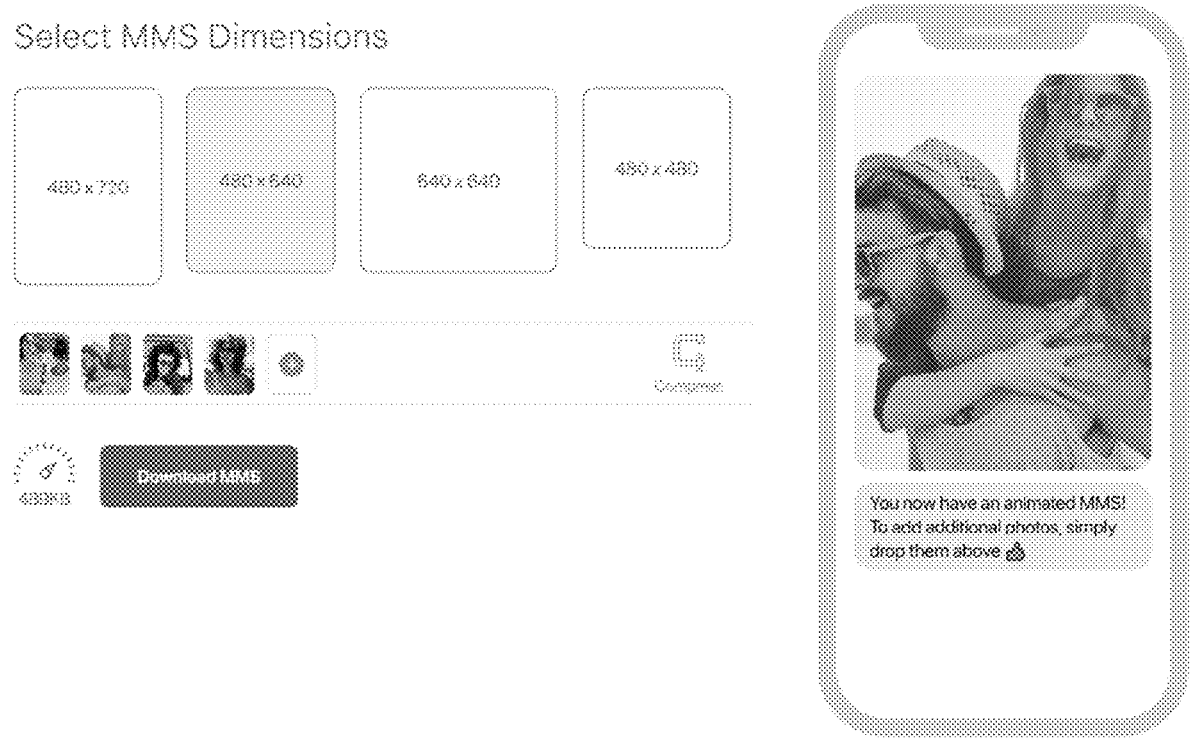

Now referring to FIGS. 13-15, and an example of a User resizing an image with a preview pane of the selected MMS dimensions overlaid onto the image is illustrated. Upon Selecting "Compress", a User is presented with a screen to allow compression to be added to the Animated GIF. Once Compress is selected, the User can do the following: the User is able to modify the compression and instantly see the estimated file size prior to applying the compression; the User is able to preview the compression impact to the animated GIF at any selected compression level; and the User can either cancel or apply the compression to the animated GIF by selecting "Optimize".

FIGS. 13-15 is a simulated screen shot after the user has uploaded two or more images to successfully create an animated MMS and again displaying the process for adding additional photos via the drag and drop method with MMS dimension selections with an icon showing the file size of the images upload and providing a clickable compression level optimization tool, where the tool shows the compression level/percentage, and the new estimated file size and the old/previous file size if the selected level of compression is performed. It is important to note that while the present invention provides and encourages "drag and drop" for uploading figures, a User does not have to Drag and Drop Photos, a user can also select the plus sign (+) option in the web app as shown in FIG. 7.

Once Compression is Applied, the User can do the following: the User can revert compression and continue to modify their animated MMS to their liking; the User can download the MMS; and the User can apply any of the other actions highlighted previously.

Figure 16A:
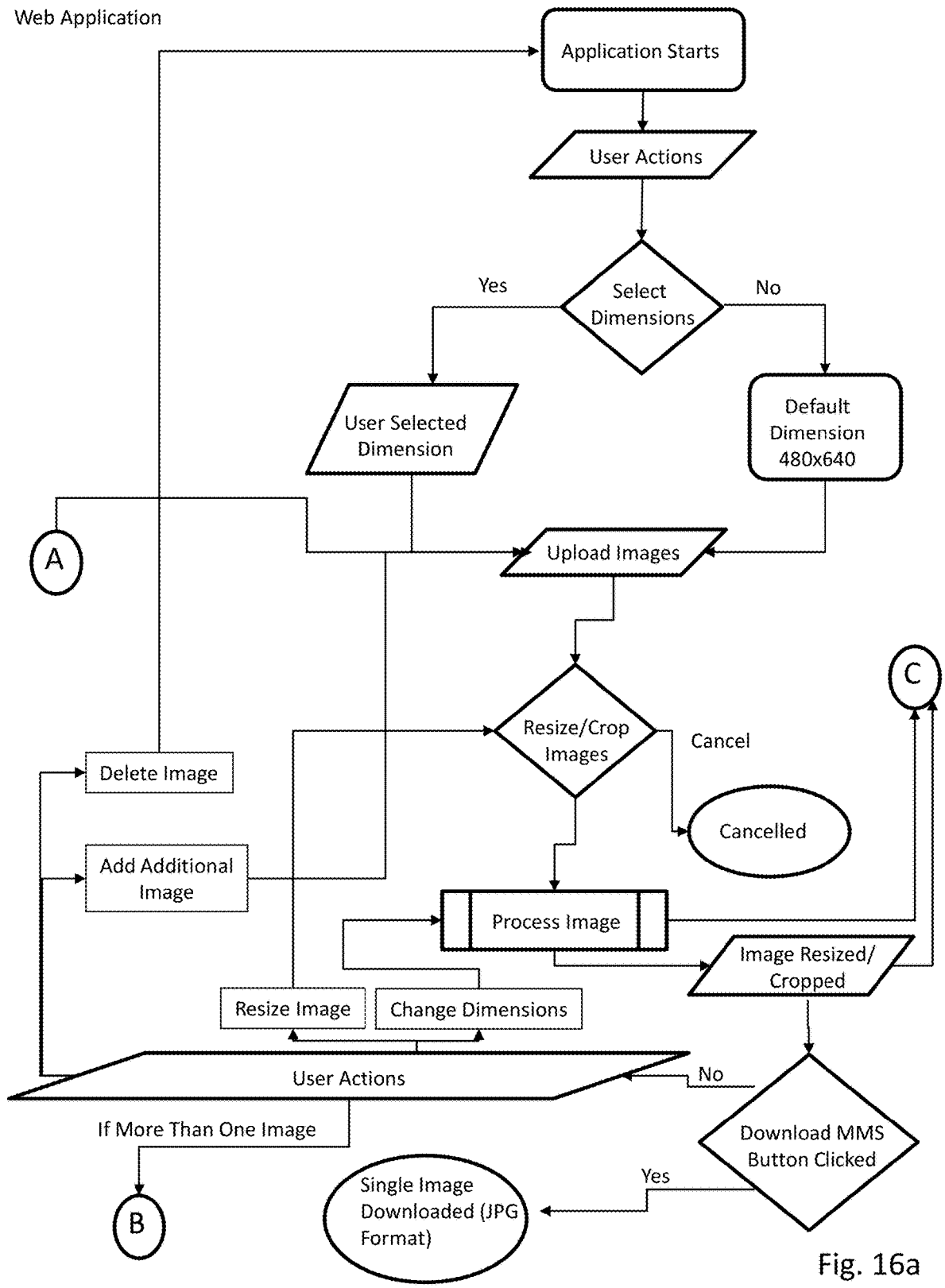
FIGS. 16a-c, illustrates the Front-End User Flow Diagram for the Application is illustrated.
Figure 16B:
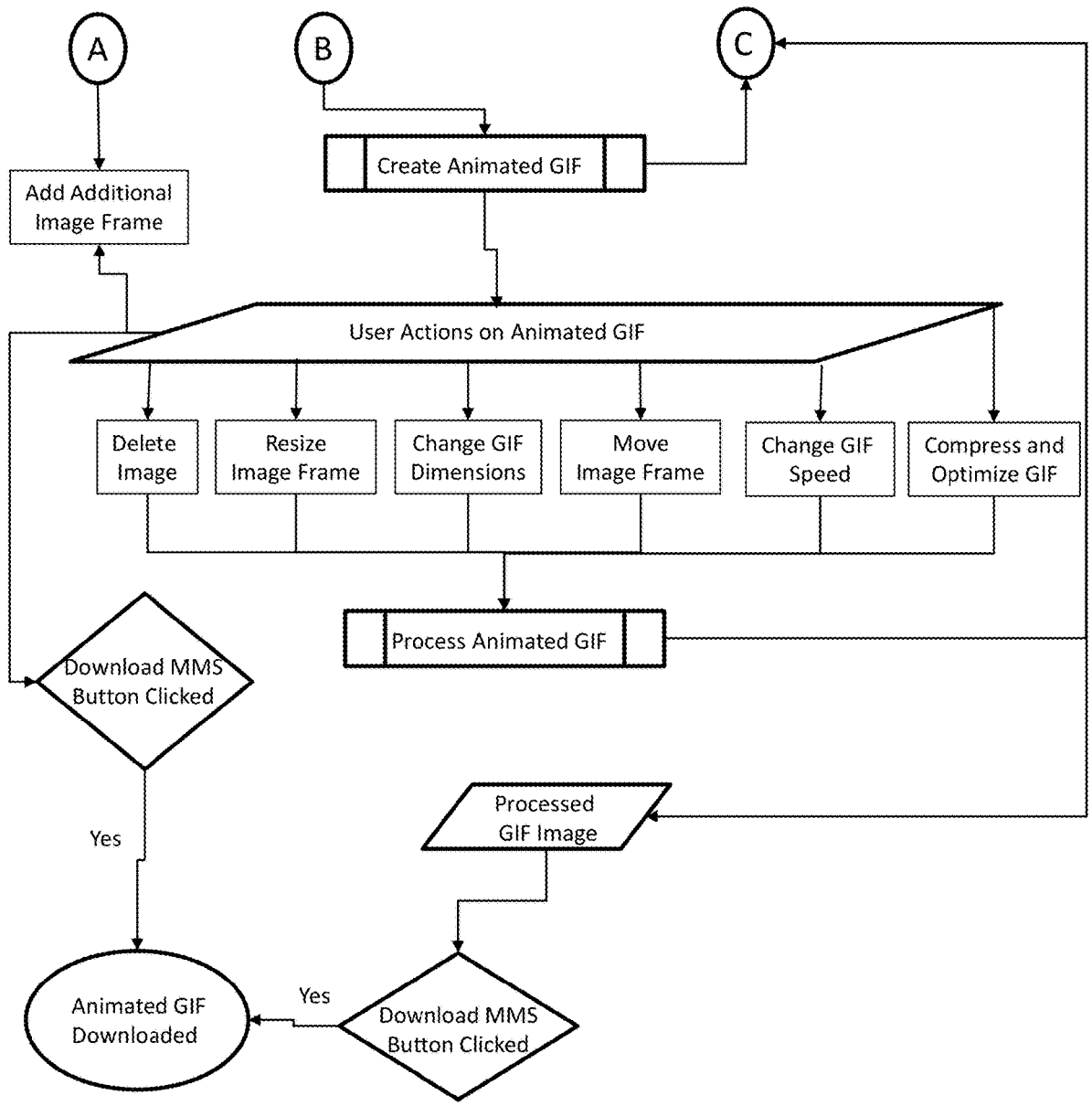
Figure 16C:
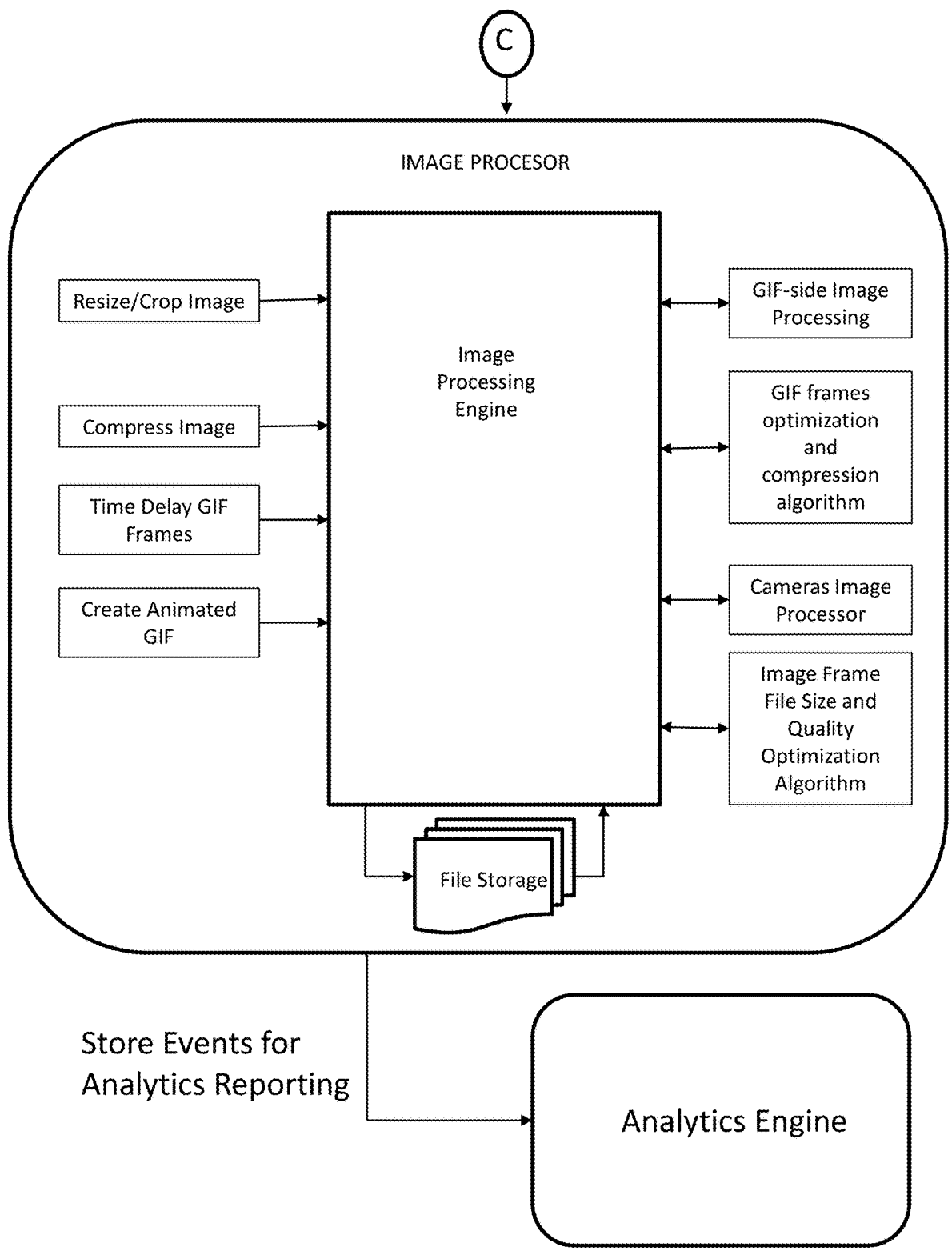

FIGS. 16a-c, illustrates the Front-End User Flow Diagram for the Application is illustrated.

Now referring to FIG. 16a, the application starts with user actions. The first user action is the selection of dimensions. If a user does not select a dimension, the default is 480×640. Next the User uploads images. One the images are uploaded, the user can delete the image and repeat the process, add additional images by repeating the process, resize images, and change dimensions. If more than one image is uploaded, the user and the images are sent to create an animated GIF via the process illustrated in FIG. 16b.

Next, the images are resized and cropped as desired and the images are processed. After processing the images are resized and cropped as desired and selected in the previous steps. Resized and cropped images are sent to the image processor illustrated by FIG. 16c. When the download MMS button is clicked, a single image down in JPG format is created.

Now referring to FIG. 16b, the process for creating an animated GIF from the upload image files is described. Here the user can delete an image, resize an image frame, change GIF dimensions, move image frames, change GIF speed, and compress and optimize a GIF.

If a user desires to add an additional image, the process returns to the upload image step as illustrated in FIG. 16a. The uploaded and selected image files are then animated by the system based on the User's selected criteria by the image processor as detailed in FIG. 16c and a processed GIF is created, animated, and downloaded when the MMS button is clicked.

Now referring to FIG. 16c, the Image Processor and process is illustrated. An image processing engine received inputs related to resize/cropping, compression, time delay GIF frames, and direction to create an animated GIF. The image processing engine then performs GIF-sided processing, GIF frames optimization and compression using a first algorithm, camera image processing, and image frame file side and quality optimization using a second algorithm.

Figure 17:
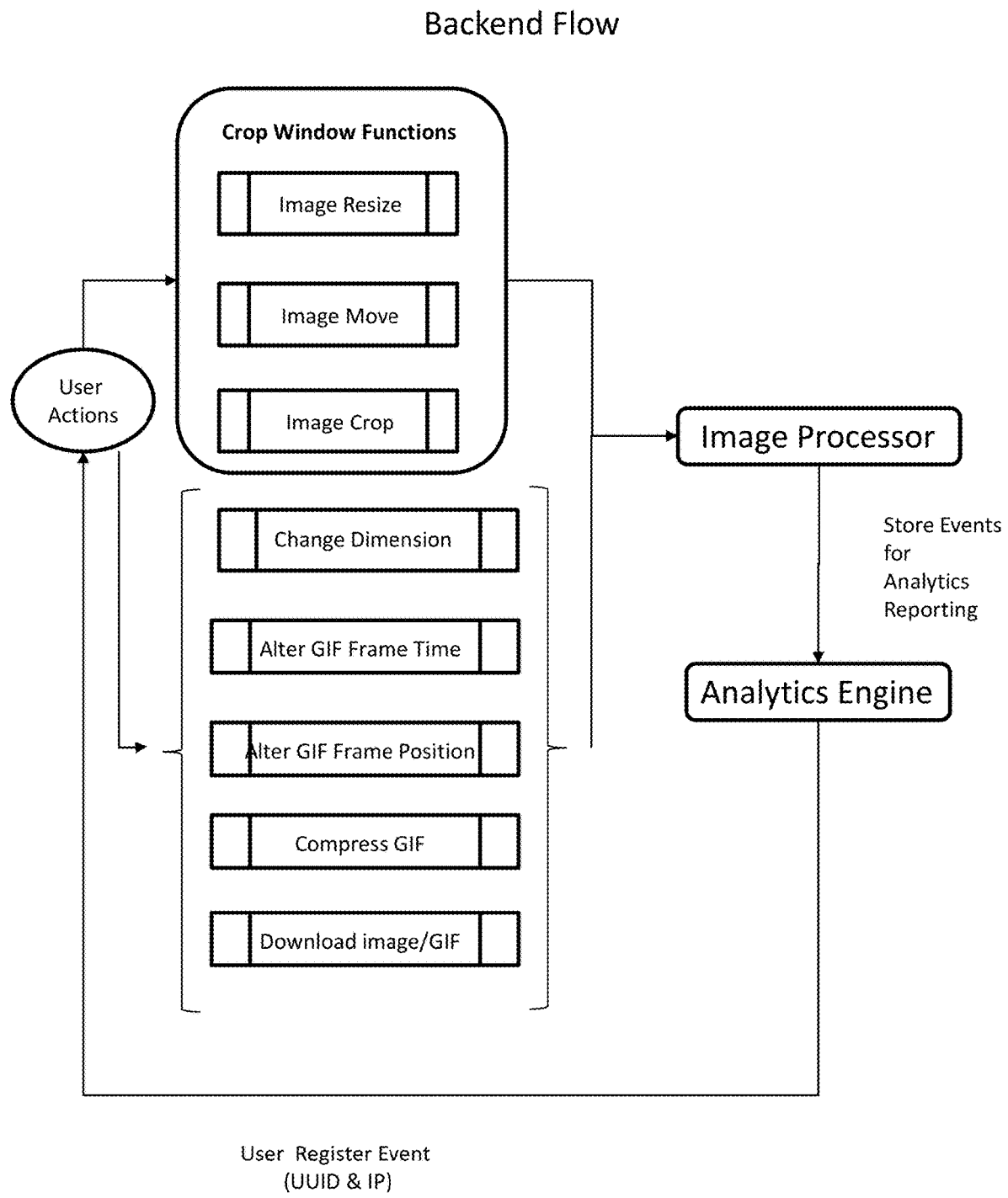
FIG. 17 illustrates the Back-End User Flow Diagram for the Application is illustrated.

Now referring to FIG. 17, the backend flow of the system and method of the present invention is illustrated. User actions are divided into two groups, crop window functions and non-crop window functions. Crop window functions include, image resizing, image movement, and image cropping. Other non-crop window functions include: change dimensions, alter GIF frame time, alter GIF frame Position, compress GIF, and download image/GIF. The user actions, after selection, are performed by the image processor as detailed in FIG. 16C and uses an analytics engine to provide feedback to system providers/developers to help enhance and drive user actions based on user registered events (UUID and IP). By driving user actions, the system could use the analytics to shape user actions if/as desirable, and/or just to see what is happening for observation, and/or to make different system adjustments or business decisions based on the analytics generated by observing and tracking user actions.

Figure 18:
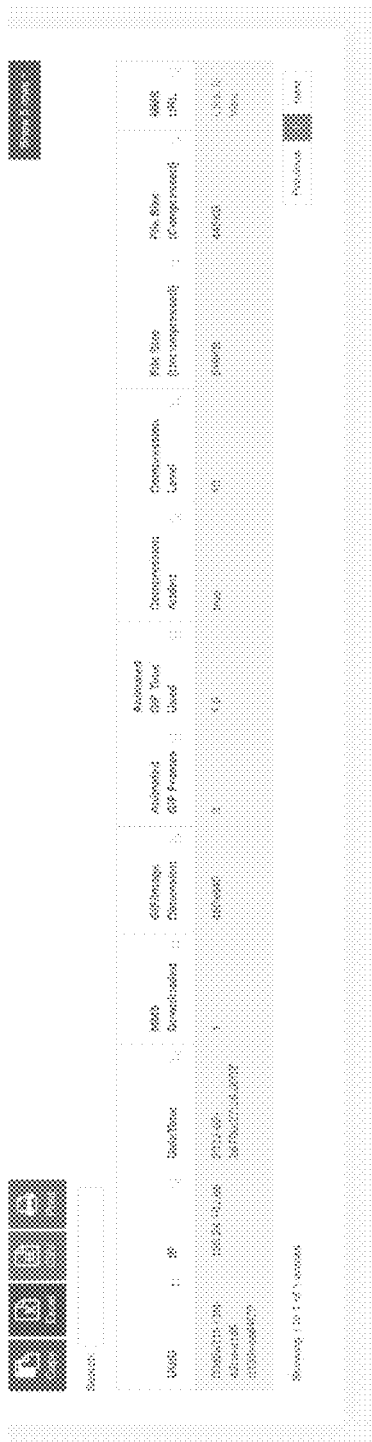
FIG. 18 is a simulated screen shot with shows the analytics tracked for report generation and usage by the system providers

The analytics engine is provided to store events and for creating analytics reports. FIG. 18 is a simulated screen shot with shows the analytics tracked for report generation and usage by the system providers. In the table of FIG. 18 the following information is tracked for each upload: UUID, IP, DateTime, Was MMS downloaded (True/False), Selected MMS Dimensions the User Downloaded with, # of Frames in the Animated GIF, Time Delay used for Frames in the Animated GIF, Was Compression Added (true/false), Level/scale of Compression, File Size (Uncompressed), File Size (Compressed), a Preview of the Image that was created with an MMS URL that can be clicked to view.

In another embodiment, the system and method of the present invention may eventually or optionally add support for text based embedding into images.

In yet another embodiment, additional components utilizing AI (artificial intelligence) for moderation and user profiling. Due to fast innovations within AI, additional components that can be utilized to improve various stages of this product are combined into the method and system taught by the present invention.

In the absence of human moderation, adding AI moderation to the system and method taught by the present invention will help with instantaneous, near real-time, reviews of videos that are deemed inappropriate by the brand based on specific words mentioned, profanity, nudity, violence, etc. Due to the fast nature of referral sharing, it is important to enable AI moderation to avoid any sort of delay with the ability to share videos.

To further enhance the video dashboard for the client, various AI tools are utilized to extract additional information about the video. This includes but is not limited to: Persona Information: Age and Gender; Language; Video Themes: Unboxing, Testimonial, and Product Feature(s).

The system is set to run on a computing device. A computing device on which the present invention can run would be comprised of a CPU, Hard Disk Drive, Keyboard, Monitor, CPU Main Memory and a portion of main memory where the system resides and executes. Any general-purpose computer with an appropriate amount of storage space is suitable for this purpose. Computer Devices like this are well known in the art and are not pertinent to the invention. The system can also be written in a number of different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The embodiments of the invention in which an exclusive property or privilege is claimed are defined as follows:

1. A system and executing methods for efficient and fast creation of animated Multimedia Messaging Service (MMS) images for use within Short Messaging Service (SMS) marketing processes, executed by a machine, comprising: an intuitive web application enabling users to perform: image uploading, image resizing, image cropping, and selection of recommended MMS images, real-time previewing, animated image reordering, animated speed controls, and image compression.

2. The system of claim 1, wherein
image dimensions are 480×720 pixels, 480×460 pixels, 640×640 pixels, and 480×480 pixels.

3. The system of claim 1, further comprising the step(s) of uploading via drag and drop a file or photo;
providing a preview of the designated MMS size while the user is scaling the image;
determining the needed cropping for the photo for the selected MMS dimensions; and
confirm the resizing by selecting "resize" or cancel out.

4. The system of claim 1, further comprising the step(s) of presenting several options to facilitate the creation of an MMS image;
presenting a preview of the MMS rendering within a phone;
uploading additional images;
resizing or deleting the current image uploaded;
changing the MMS dimensions to any of the other commonly used sizes;
presenting the current file size uncompressed; and
providing the ability to download the single image MMS for use in any SMS Marketing Platform.

5. The system of claim 1, further comprising the step(s) of animating the MMS once the second image is uploaded;
presenting a user with several options,
proceeding with uploading additional images;
changing the MMS dimensions to any of the other commonly used sizes;
presenting the current file size uncompressed;
changing the cropping of any of the images uploaded;
presenting the ability to compress the animated gif;
presenting the ability to change the order of the frames in the animation;
presenting the ability to change the time animation; and
providing the ability to download the animated MMS as a .GIF file for use in any SMS Marketing Platform.

6. The system of claim 5, wherein
by default, the animation is set to 1 second per frame.

7. The system of claim 1, further comprising the step(s) of providing an alert when an Animated GIF is above the recommended image size of 500 kb with visual cues as well as a message.

8. The system of claim 7, further comprising the step(s) of providing one or more GIF compression libraries to add compression to the animated GIF.

9. The system of claim 8, further comprising the step(s) of resizing an image with a preview pane of the selected MMS dimensions overlaid onto the image is illustrated; and
upon Selecting "Compress", presenting a screen to allow compression to be added to the Animated GIF.

10. The system of claim 9, further comprising the step(s) of
once compress is selected,
providing the ability to modify the compression and displaying an updated estimated file size in real time prior to applying the compression;
providing the ability to preview the compression impact to the animated GIF at any selected compression level; and
providing the option to cancel or apply the compression to the animated GIF by selecting "Optimize".

11. The system of claim 1, further comprising the step(s) of
downloading two or more images to successfully create an animated MMS;
displaying the process for adding additional photos via the drag and drop method with MMS dimension selections with an icon showing the file size of the images upload and providing a clickable compression level optimization tool, where the tool shows the compression level/percentage, and
displaying the new estimated file size and the old/previous file size if the selected level of compression is performed.

12. The system of claim 1, further comprising the step(s) of
applying compression,
reverting compression;
continuing to modify an animated MMS; and
downloading the MMS.

13. A system executing methods for efficient and fast creation of animated Multimedia Messaging Service (MMS) images for use within Short Messaging Service (SMS) marketing processes, executed by a machine, comprising the steps of: selection of dimensions; uploading one or more images; optionally deleting images; repeating the process of uploading and deleting images until the desired images are combined; and repeating the process, adding additional images by repeating the process, resizing images, and changing dimensions uploading additional images using the same steps of uploading, resizing, and selecting MMS dimensions, adjusting image content size, and selecting different MMS output dimensions.

14. The system of claim 13, wherein
if no dimension is selected, the default is 480×640 pixels.

15. The system of claim 13, wherein
if more than one image is uploaded, the images are sent to create an animated GIF via a create animated GIF process.

16. The system of claim 15, wherein the images are resized, cropped as desired and processed; after processing the images are resized and cropped as desired and selected in the previous steps; resized and cropped images are sent to an image processor; and when the download MMS button is clicked, a single image in JPG format is created.

17. The system of claim 13, further comprising the steps of
delete an image,
resize an image frame,
change GIF dimensions,
move image frames,
change GIF speed, and
compress and optimize a GIF.

18. The system of claim 13, wherein
if a user desires to add an additional image, the process returns to the upload image step;
the uploaded and selected image files are then animated by the system based on the User's selected criteria by the image processor; and
a processed GIF is created, animated, and downloaded when the MMS button is clicked.

19. The system of claim 13, wherein
an image processing engine receives inputs related to resize/cropping, compression, time delay GIF frames, and direction to create an animated GIF;
the image processing engine then performs
GIF-sided processing,
GIF frames optimization and compression using a first algorithm,
camera image processing,
and image frame file side and quality optimization using a second algorithm.

20. The system of claim 19, further comprising an analytics engine provided to store events and for creating analytics reports.

21. The system of claim 20, wherein a system backend provides two user actions as inputs divided into two groups, crop window functions and non-crop window functions; crop window functions include, image resizing, image movement, and image cropping; non-crop window functions include: change dimensions, alter GIF frame time, alter GIF frame position, compress GIF, and download image or GIF; and the user actions, after selection, are performed by the image processor and uses the analytics engine to provide feedback to help enhance and drive user actions based on user registered events.

22. The system of claim 13, further comprising
automated, real-time or near real-time moderation to help with reviews of videos that are deemed inappropriate by a brand.

23. The system of claim 22, wherein
videos are deemed inappropriate based on specific words mentioned, profanity, nudity, and violence.

24. The system of claim 13, further comprising the step of extracting rich metadata using artificial intelligence methods (AI).

25. The system of claim 13, further comprising artificial intelligence (AI) tools utilized to extract additional information about a video.

26. The system of claim 25, wherein additional information extracted by AI tools includes persona information: age and gender, language, video themes: unboxing, testimonial, and product feature(s).

* * * * *